United States Patent [19]

Pinck et al.

[11] Patent Number: 4,469,111
[45] Date of Patent: Sep. 4, 1984

[54] APPARATUS FOR PERFORATING WEBS OF WRAPPING MATERIAL FOR TOBACCO OR THE LIKE

[75] Inventors: Peter Pinck, Gross-Hansdorf; Elke Köhler, Hamburg, both of Fed. Rep. of Germany

[73] Assignee: Hauni-Werke Körber & Co. KG., Hamburg, Fed. Rep. of Germany

[21] Appl. No.: 294,815

[22] Filed: Aug. 20, 1981

Related U.S. Application Data

[63] Continuation-in-part of Ser. No. 254,527, Apr. 15, 1981, abandoned.

[30] Foreign Application Priority Data

Apr. 25, 1980 [DE] Fed. Rep. of Germany ....... 3015912
Jul. 10, 1981 [DE] Fed. Rep. of Germany ....... 3127213

[51] Int. Cl.³ .......................... A24C 5/00; A24C 5/60
[52] U.S. Cl. .................................................. 131/281
[58] Field of Search ................. 131/281, 365; 219/384

[56] References Cited

U.S. PATENT DOCUMENTS

| | | | |
|---|---|---|---|
| 2,763,759 | 9/1956 | Mito et al. | 219/384 |
| 3,862,396 | 1/1975 | Machida et al. | 219/384 |
| 4,040,425 | 8/1977 | Goodling et al. | 219/384 |
| 4,207,458 | 6/1980 | Lilly et al. | 219/384 |
| 4,219,727 | 8/1980 | Bolt | 131/281 |
| 4,232,574 | 11/1980 | Hall | 131/281 |
| 4,236,062 | 11/1980 | Lilly et al. | 131/281 |
| 4,253,010 | 2/1981 | Brown et al. | 219/384 |

FOREIGN PATENT DOCUMENTS 2734643 8/1977 Fed. Rep. of Germany ...... 131/281
2833527 2/1979 Fed. Rep. of Germany ...... 131/281

Primary Examiner—Vincent Millin
Attorney, Agent, or Firm—Peter K. Kontler

[57] ABSTRACT

Apparatus for making holes in a running web of tipping paper for filter cigarettes has a carrier for a battery of suitably distributed perforating units each of which has an optical system for focusing upon the running web a discrete beam of coherent radiation which is furnished by a laser. The making of holes entails the development of contaminants, and such contaminants are removed by air streams which are circulated through the perforating units not only to remove the contaminants but also to cool the optical systems of the respective perforating units. The web advances along the convex side of a shroud which maintains the web at an optimum distance from the optical systems of the perforating units. The shroud is installed between the web and the perforating units and has elongated slot-shaped apertures for the beams of radiation. The perforating units form several rows, and the shroud has or can have one elongated aperture for each row of perforating units. Air streams are caused to flow along the concave side of the shroud as well as along the exposed side of the web in the region of the shroud; such air streams remove those contaminants which would tend to accumulate along the edges bounding the apertures of the shroud.

64 Claims, 6 Drawing Figures

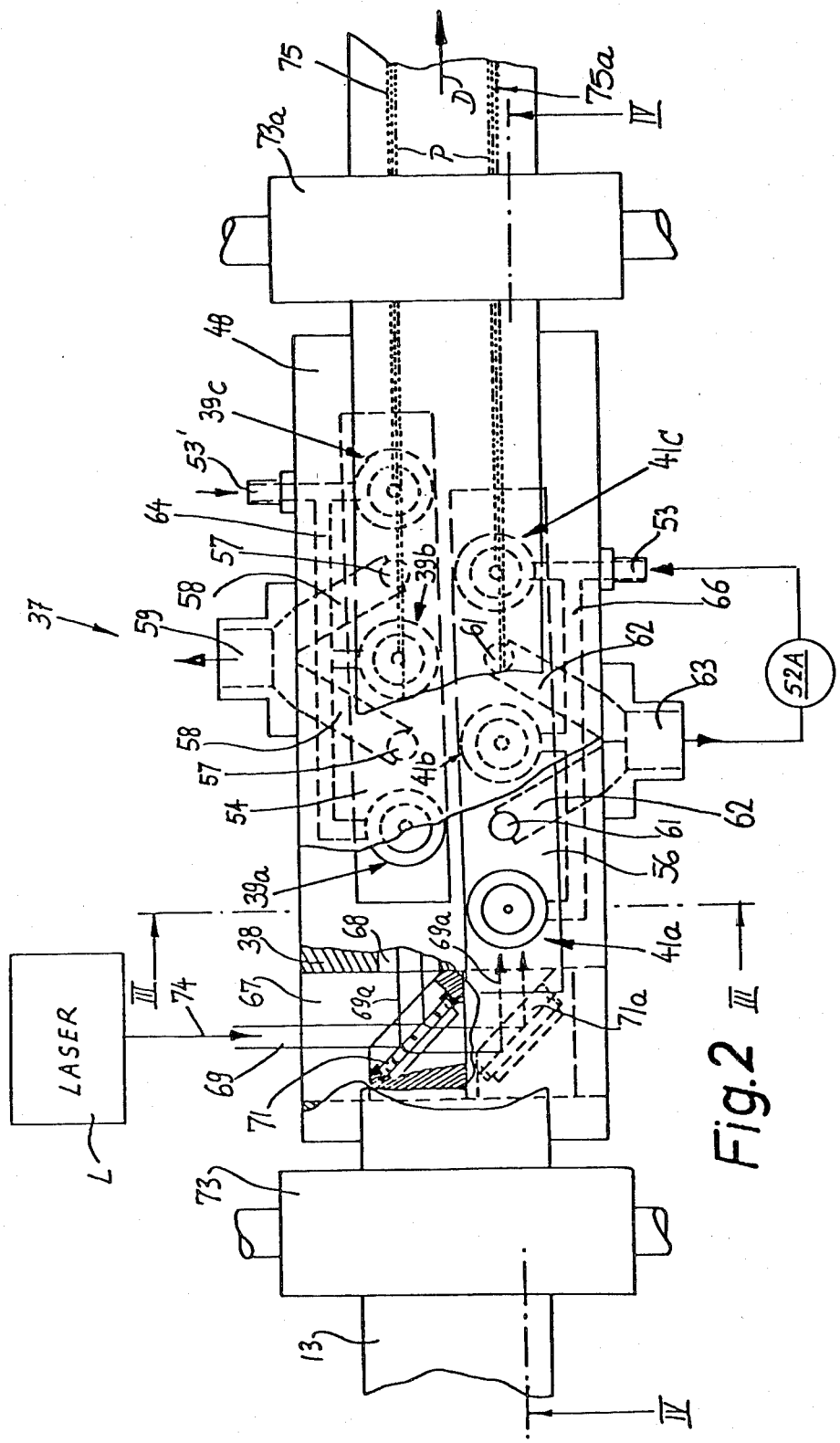

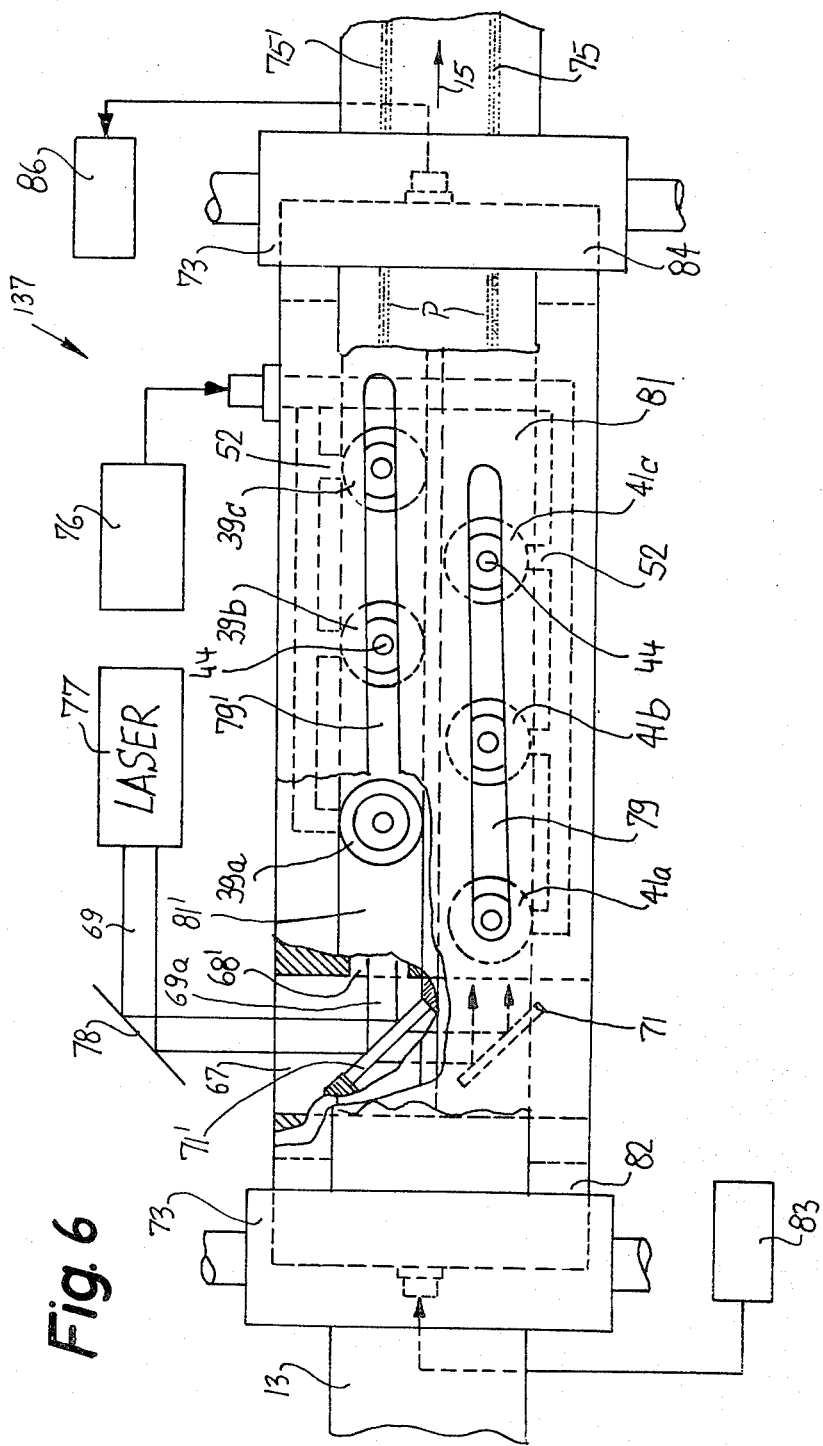

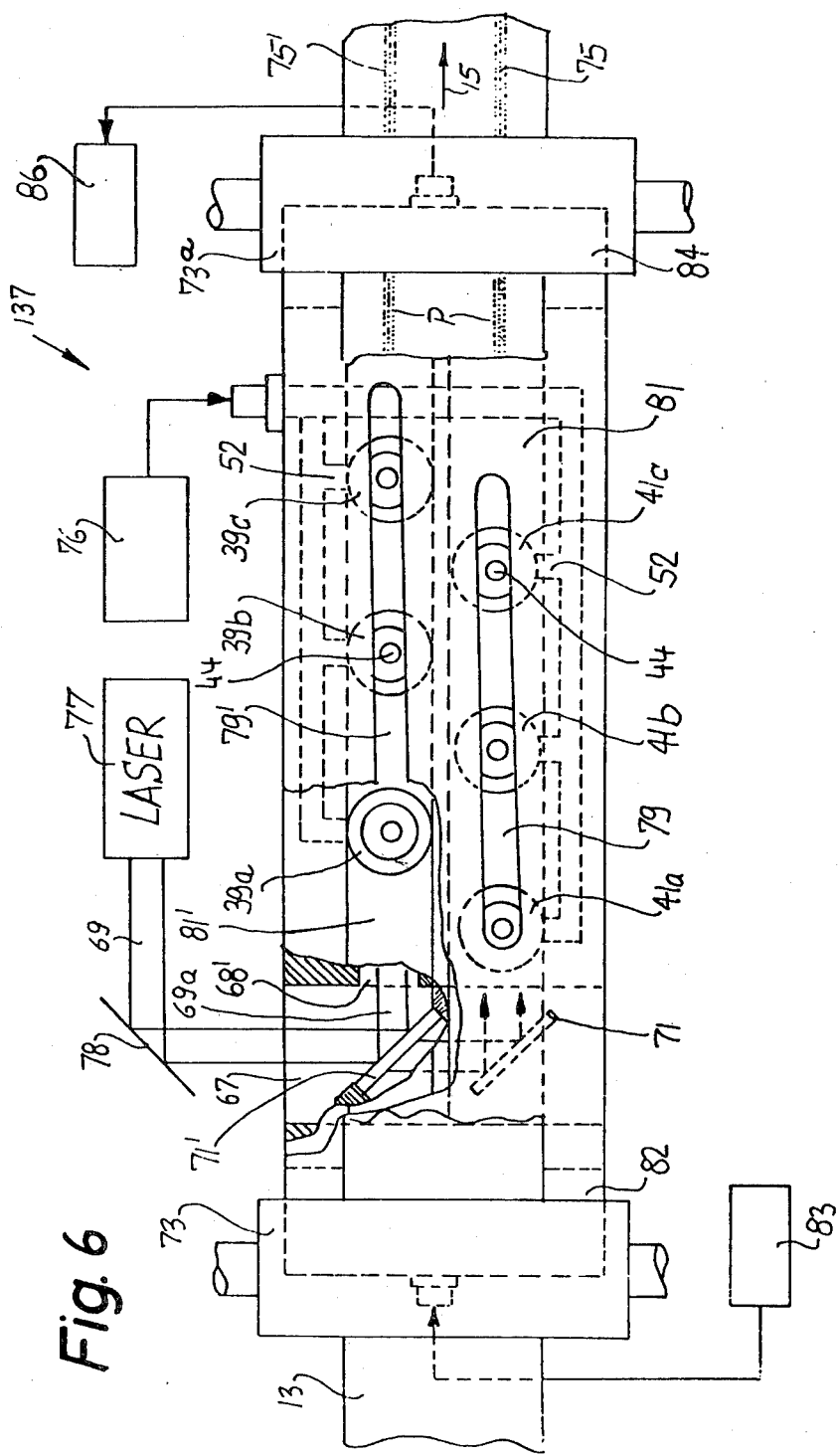

APPARATUS FOR PERFORATING WEBS OF WRAPPING MATERIAL FOR TOBACCO OR THE LIKE

CROSS-REFERENCE TO RELATED APPLICATION

This is a continuation-in-part of our application Ser. No. 254,527 filed Apr. 15, 1981, now abandoned.

BACKGROUND OF THE INVENTION

The present invention relates to apparatus for perforating webs, sheets, strips or bands of flexible material, such as paper, imitation cork, cardboard, a synthetic plastic substance or the like. More particularly, the invention relates to improvements in apparatus which can be utilized with advantage to form perforations in a running (continuous or interrupted) web of cigarette paper or the like while the web is transported lengthwise in a cigarette making, filter tipping or other tobacco and/or filter material processing machine. Still more particularly, the invention relates to improvements in perforating apparatus wherein the means for forming perforations includes one or more devices for focusing one or more beams of coherent radiation onto the running web of paper or the like.

It is already known to form perforations in a web of cigarette paper, imitation cork or similar flexible strip, band or sheet material which is used in the manufacture of rod-shaped smokers' products. The perforations are desirable, especially if the permeability of the material of the web is not sufficiently high, in order to ensure that, when a smoker draws a column of tobacco smoke into his or her lungs, the smoke is mixed with a certain quantity of cool atmospheric air which penetrates into the interior of the smokers' product by way of the perforations and contributes to interception and/or neutralization of certain amounts of nicotine, condensate and/or other deleterious or presumably deleterious ingredients of tobacco smoke. For example, many types of filter cigarettes are formed with annuli of perforations which are provided in a short tube serving to connect the filter plug to the tobacco-containing portion of the cigarette. The tube is a converted uniting band which is obtained by severing a running web of cigarette paper, imitation cork or like strip-shaped material (called tipping paper) at regular intervals to form a succession of discrete uniting bands. Successive uniting bands are attached to and rolled around groups of coaxial filter plugs and cigarettes in a suitable filter tipping machine, such as the machines known as MAX or MAX S manufactured and sold by the assignee of the present invention.

If the perforations are to be formed in the wrapper of a plain cigarette, they are normally provided close to that end of the cigarette which is inserted into the mouth during smoking.

It is also known to make perforations by resorting to an apparatus which is equipped with one or more lasers. Reference may be had to German Offenlegungsschrift No. 2,754,104. It has been found that coherent radiation which is emitted by a laser is especially suited to ensure the formation of perforations having a predictable size and/or shape, as well as that a laser is capable of perforating a rapidly running web of cigarette paper or the like. Perforating apparatus which employ one or more lasers are further disclosed in commonly owned U.S. Pat. Nos. 4,193,409 and 4,249,545, and in commonly owned U.S. patent application Ser. No. 834,648 filed Sept. 19, 1977 by Heitmann et al.

A drawback of presently known perforating apparatus is that they are likely to become contaminated, for example, by the material which is separated from the running web during making of the perforations therein. The contamination is likely to occur regardless of whether the apparatus employs one or more mechanical perforating devices, one or more electrical perforating devices (e.g., pairs of electrodes which define spark gaps through which the material of the running web is advanced) or one or more lasers or other sources of coherent radiation. Such contamination necessitates frequent interruptions in operation of the machine in which the perforating apparatus is installed. This is especially undesirable if the machine is a modern high-speed maker of cigarettes or filter rods because such machines turn out inordinately large quantities of rod-shaped articles per unit of time (e.g., a modern cigarette maker can produce up to and in excess of 100 plain cigarettes per second) so that each and every interruption of operation of such a machine entails tremendous losses in output.

OBJECTS AND SUMMARY OF THE INVENTION

An object of the invention is to provide a novel and improved perforating apparatus for making holes in webs of cigarette paper or the like which is constructed and assembled in such a way that it is much less likely to contaminate its own components and/or the components of the machine in which it is installed than heretofore known perforating apparatus.

Another object of the invention is to provide a perforating apparatus of the above outlined character which not only reduces the likelihood of contamination of its own components and/or of component parts of the associated machine but is also capable of automatically maintaining the temperature of its parts at an optimum value or within an acceptable range.

A further object of the invention is to provide a perforating apparatus which automatically gathers and removes any and all impurities which are likely to accumulate at or close to the region of making holes in a running web of paper, imitation cork, synthetic plastic material or the like.

An additional object of the invention is to provide an apparatus which can operate, without any interruptions, for intervals of time which are incomparably longer than the intervals of possible uninterrupted use of heretofore known perforating apparatus for running paper webs or the like.

Still another object of the invention is to provide a novel and improved apparatus which relies for its perforating action upon one or more beams of coherent radiation.

A further object of the invention is to provide a perforating apparatus, especially a perforating apparatus which employs one or more lasers, whose compactness at least matches that of heretofore known perforating apparatus even though the improved apparatus exhibits many features which are absent in conventional apparatus.

Still another object of the invention is to provide a perforating apparatus which can form in a running (continuous or interrupted) web of cigarette paper or the like one or more rows of perforations with a degree of precision and reproducibility that cannot be matched by heretofore known perforating apparatus.

A further object of the invention is to provide a perforating apparatus which requires less attention and maintenance than conventional perforating apparatus, which can be designed to provide a running web of paper or the like with one or more files of perforations, and which can be installed in many existing types of cigarette making, filter tipping or other machines as a superior substitute for presently employed perforating apparatus.

Another object of the invention is to provide a perforating apparatus which, even though ideally suited for the making of perforations in a web of wrapping material for articles or substances which constitute or form part of smokers' products, can be used with equal or nearly equal advantage in many other fields where the making of perforations in a running strip, tape, sheet or web of flexible material is advisable or necessary.

A further object of the invention is to provide a perforating apparatus which can make perforations in a rapidly running web of cigarette paper, imitation cork or like wrapping material, either in a machine in which the wrapping material is converted or in a machine in which the wrapping material is formed, coiled, packed or otherwise processed preparatory to transport to a cigarette making or other plant.

Still another object of the invention is to provide the apparatus with novel and improved means for removing impurities which develop as a result of impingement of one or more laser beams upon a running web of cigarette paper, tipping paper or the like.

A further object of the invention is to provide the just outlined apparatus with a novel and improved system for cooling the means which focuses or focus one or more laser beams upon a running web of tipping paper, cigarette paper, imitation cork or similar sheet- strip- or band-like material.

Another object of the invention is to provide novel and improved guide means for webs of paper or the like at and in the region of the perforating station.

An additional object of the invention is to provide an apparatus which requires less maintenance than heretofore known apparatus even though it can operate without interruptions for much longer intervals of time.

A further object of the invention is to provide novel and improved means for removing contaminants at both sides of the running web of paper, imitation cork or like material at and in the general area of the perforating station.

Another object of the invention is to provide the apparatus with novel and improved means for ensuring reproducible perforation of a rapidly running web of paper or the like by one or more beams of coherent radiation.

The invention resides in the provision of an apparatus for making holes (e.g., minute perforations) in a sheet-like material, particularly in a running web of wrapping material for rod-shaped articles which constitute or form part of smokers' products. The apparatus comprises at least one perforating unit or head having means (e.g., including a collector lens) for making holes in the sheet-like material (the lens can be arranged to focus a beam of coherent radiation upon the sheet-like material) with attendant development of contaminants and the tendency of such contaminants to accumulate in the region of the unit (e.g., in the region of a nozzle having a radiation discharging outlet or orifice for a beam of coherent radiation which is focused upon the sheet-like material), and means for conveying at least one stream of gaseous fluid (e.g., air or nitrogen) past the aforementioned region so that the conveyed fluid entrains and removes contaminants from such region.

If the perforating apparatus is designed to form holes or perforations by resorting to one or more beams of coherent radiation, it further comprises at least one source of coherent radiation (preferably at least one laser).

The perforating unit further comprises a substantially closed housing which may form a removable or integral part of a carrier capable of accommodating two or more perforating units which can be disposed in one or more rows extending in parallelism with the longitudinal direction of a running web of wrapping material if the sheet-like material is a web, and such housing is then provided with a radiation admitting inlet (such inlet can be defined by a window which includes or accommodates the aforementioned focusing means for coherent radiation) and a radiation discharging outlet (e.g., the aforementioned orifice). The apparatus preferably further comprises a shroud which is interposed between the sheet-like material and the perforating unit and has an aperture in register with the orifice so that the optical system can focus the beam upon the sheet-like material. The shroud can be formed with a slide surface along which the sheet-like material can be transported by suitable guide rolls of a machine in which the apparatus is put to use.

The housing is preferably formed with a chamber between the inlet and outlet means, and the housing and the shroud preferably define at least one compartment which communicates with the outlet means. The conveying means then comprises means for establishing a pressure differential between the compartment and the chamber so that a gaseous fluid which is admitted into the chamber can flow through the outlet means and into the compartment. The fluid not only removes contaminants from the region of the nozzle and aperture in the shroud but can also cool the optical system at the inlet means for admission of radiation into the housing. Still further, some of the admitted gaseous fluid can issue from the aperture of the shroud to form a layer or cushion of gaseous lubricant between the sheet-like material and the adjacent surface of the shroud.

The aperture of the shroud may constitute an elongated slot which is parallel with the longitudinal direction of the web and can overlie the outlet openings of two or more perforating units. The provision of such slot-shaped aperture reduces the likelihood of deposition of contaminants on the shroud, especially in the region of the aperture. If the apparatus comprises several rows of perforating units, the shroud is preferably formed with an equal number of elongated slot-shaped apertures and each aperture overlies the outlets of housings of the perforating units in the respective row. Streams of air, nitrogen or another protective gas can be caused to flow along the inner side of the shroud as well as along the outer or exposed side of the running web to remove at least the major part of contaminants with attendant further reduction of the likelihood of accumulation of such contaminants on the shroud. In the absence of such streams, contaminants (e.g., fragments of charred paper or the like) would exhibit a tendency to accumulate on the shroud and, in the absence of one or more elongated slot-shaped apertures, the contaminants accumulating on the shroud would be likely to interfere with predictable propagation of coherent radiation all the way to the plane of the running web.

The novel features which are considered as characteristic of the invention are set forth in particular in the appended claims. The improved perforating apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a plan view of the structure shown in FIG. 5, with certain parts partially broken away.

DESCRIPTION OF THE PREFERRED EMBODIMENTS

Figure 1:
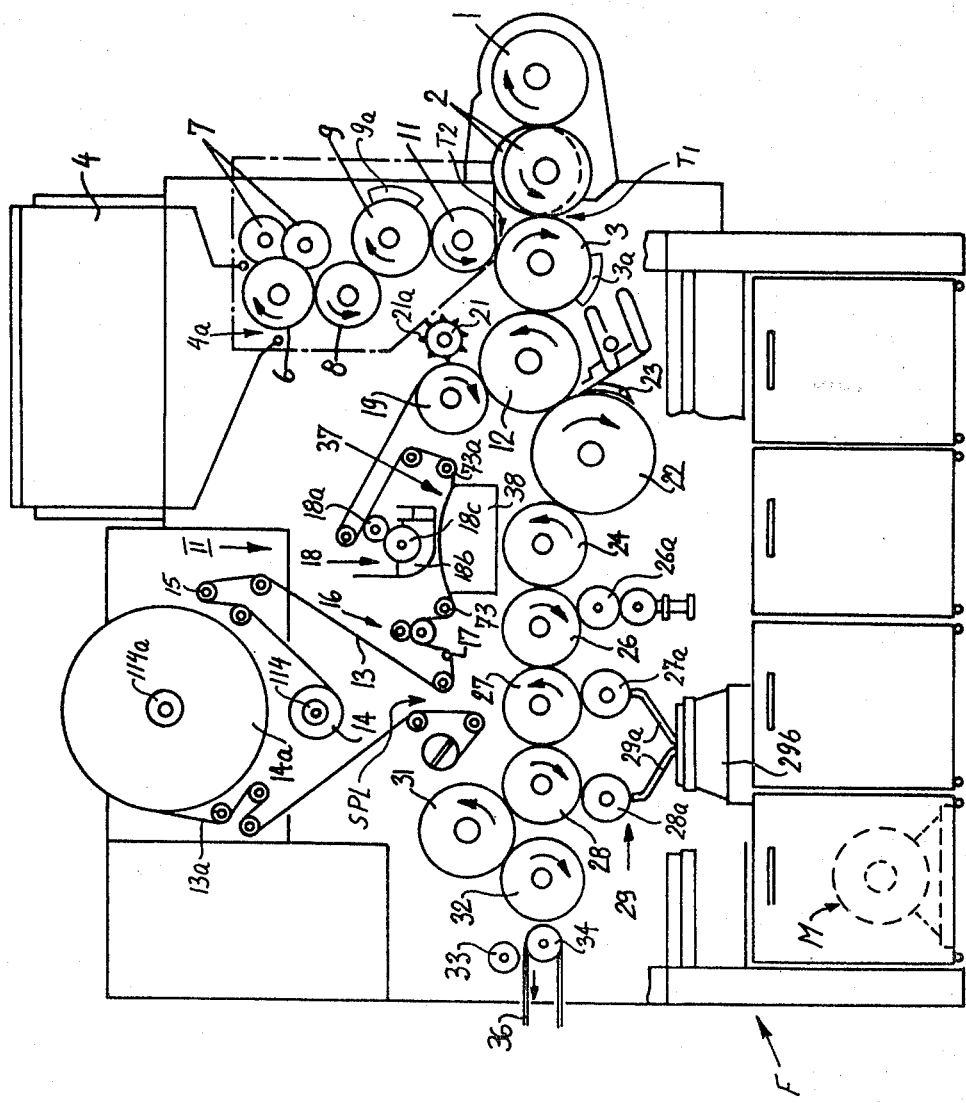
FIG. 1 is a schematic front elevational view of a filter tipping machine including a perforating apparatus which embodies the present invention.

Referring first to FIG. 1, there is shown a filter tipping machine of the type known as MAX S which is manufactured and sold by the assignee of the present application. The construction of the filter tipping machine, which is directly coupled to a cigarette making machine (for example, a machine known as SE 80 manufactured and sold by the assignee of the present application) is as follows:

The frame F of the filter tipping machine supports a rotary drum-shaped conveyor 1 which can be said to form part of the aforementioned cigarette making machine and delivers two rows of plain cigarettes of unit length to a pair of staggered rotary drum-shaped aligning conveyors 2. The plain cigarettes of one row of cigarettes in the axially parallel peripheral flutes of the row forming conveyor 1 are adjacent to one axial end, and the plain cigarettes of the other row are adjacent to the other axial end of this conveyor. Furthermore, the cigarettes of one row are transported by oddly numbered flutes whereas the cigarettes of the other row are transported by evenly numbered flutes of the conveyor 1. The two rows of cigarettes are transferred into the peripheral flutes of the corresponding aligning conveyors 2 which rotate in a counterclockwise direction, as viewed in FIG. 1, and are driven at different speeds and/or transport the respective cigarettes through different distances so that, when a flute of the front aligning conveyor 2, as viewed in FIG. 1, reaches a transfer station T1, it is an accurate axial alignment with a flute of the rear aligning conveyor 2. Such aligned flutes deliver a pair of coaxial plain cigarettes of unit length into the adjacent flute of a rotary drum-shaped assembly conveyor 3 which is driven to rotate in a clockwise direction, as viewed in FIG. 1.

The top portion of the frame F supports a magazine 4 for a supply of parallel rod-shaped filter rod sections (not specifically shown) of six times unit length. The outlet opening 4a at the lower end of the magazine 4 receives a portion of a rotary drum-shaped severing conveyor 6 which is driven to rotate in a clockwise direction, as viewed in FIG. 1, and has peripheral flutes extending in parallelism with its axis. Such flutes remove from the magazine 4 discrete filter rod sections of six times unit length and transport successive filter rod sections past two rotary disc-shaped knives 7 which rotate about parallel axes and are staggered with respect to each other, as considered in the axial direction of the severing conveyor 6. The conveyor 6 cooperates with the knives 7 to convert successive filter rod sections of six times unit length into sets of three coaxial filter plugs of double unit length, and the filter plugs of successive sets are transferred onto a rotary staggering conveyor 8. The conveyor 8 is assembled of three discs which may but need not rotate about a common axis and are driven at different speeds and/or transport the respective filter plugs through different distances so that the filter plugs of each set are staggered with respect to each other, as considered in the circumferential direction of the conveyor 8, prior to transfer of successive filter plugs of double unit length into successive peripheral flutes of a rotary drum-shaped shuffling conveyor 9. The conveyor 9 is driven to rotate in a clockwise direction, as viewed in FIG. 1, and cooperates with two stationary cams 9a (only one shown) to convert the single row of axially staggered filter plugs into a row wherein each preceding filter plug is in accurate alignment with the next-following plug prior to transfer of successive plugs of the thus obtained row into successive flutes of a combined accelerating and inserting conveyor 11. The conveyor 11 is a rotary drum whose flutes deliver filter plugs of double unit length into successive flutes of the assembly conveyor 3 at a second transfer station T2 which is located upstream of the transfer station T1. The pairs of plain cigarettes of unit length which are delivered into the flutes of the assembly conveyor 3 at the transfer station T1 are spaced apart from each other by a distance which at least equals the axial length of a filter plug of double unit length, and the inserting conveyor 11 delivers filter plugs into successive flutes at the station T2 in such positions that, upon arrival at the transfer station T1, the filter plugs are located in the gaps between the corresponding plain cigarettes of unit length. The assembly conveyor 3 advances the thus obtained groups of three coaxial rod-shaped articles each through the space between two suitably configurated condensing cams 3a (only one shown) which cause the plain cigarettes to move axially toward each other and into abutment with the respective end faces of the corresponding filter plug of double unit length.

The assembly conveyor 3 delivers successive condensed groups (each such group contains two coaxial plain cigarettes of unit length and a filter plug of double unit length therebetween) into successive flutes of a rotary drum-shaped transfer conveyor 12. This conveyor further receives adhesive-coated uniting bands from a rotary drum-shaped suction conveyor 19 which cooperates with the blades 21a of a rotary cutter 21.

The uniting bands are obtained in response to severing of the leader of a continuous web 13 of cigarette paper, imitation cork or another suitable flexible strip-shaped wrapping material (also called tipping paper). Such material is drawn off a reel 14 which is mounted on a spindle 114 and is caused to travel around a plurality of guide rolls 15 prior to reaching a so-called curling device 17 of the type disclosed in commonly owned U.S. Pat. No. 3,962,957 granted June 15, 1976 to Alfred Hinzmann. After advancing beyond the curling device 17, successive increments of the web 13 enter the nip of two advancing rolls 16 at least one of which is driven to advance the web in a direction toward a guide roll 73. The leader of the web 13 adheres to the foraminous peripheral surface of the suction conveyor 19 and is caused to advance past successive blades 21a of the rotating cutter 21. The latter cooperates with the conveyor 19 to convert the web 13 into a series of discrete web portions or uniting bands of predetermined length. The conveyor 19 draws the web 13 from the guide roll 73 and transports the web past a perforating apparatus 37 which is constructed and assembled in accordance with the present invention. A second guide roll 73a is located immediately or closely upstream of the roller-shaped applicator 18a of a paster 18 which coats one side of the web 13 with a suitable adhesive. The applicator 18a receives adhesive from a source of supply here shown as a tank 18b by way of a withdrawing roll 18c and coats a portion of or the entire underside of the travelling web 13.

The conveyor 19 applies successive discrete uniting bands to successive groups of coaxial rod-shaped articles in the oncoming flutes of the transfer conveyor 12. The uniting bands are preferably applied in such a way that they are disposed substantially tangentially of the respective groups and adhere to the corresponding filter plugs as well as to the innermost portions of the respective plain cigarettes of unit length. Such groups, each of which carries an adhesive-coated uniting band, are thereupon transferred onto the peripheral surface of a rotary drum-shaped wrapping conveyor 22 which cooperates with an adjustable (stationary or mobile) rolling device 23 to convolute the oncoming uniting bands around the respective groups so that each group constitutes a filter cigarette of double unit length.

The wrapping conveyor 22 delivers successive filter cigarettes of double unit length into successive flutes of a rotary drum-shaped drying conveyor 24 which can embody or is associated with suitable testing means for detection of filter cigarettes having defective wrappers. At least those filter cigarettes of double unit length whose wrappers are satisfactory are thereupon delivered into successive flutes of a rotary drum-shaped severing conveyor 26 which cooperates with a rotary disk-shaped knife 26a to sever each filter cigarette of double unit length midway across its filter plug so that each such cigarette yields two coaxial filter cigarettes of unit length. Each filter cigarette of unit length contains a plain cigarette of unit length, a filter plug of unit length, and one-half of a convoluted tubular uniting band which binds the filter plug to the respective plain cigarette.

The severing conveyor 26 delivers successive pairs of filter cigarettes of unit length into successive flutes of a rotary drum-shaped conveyor 27 of a turn-around device 29 of the type disclosed in commonly owned U.S. Pat. No. 3,583,546 granted to Gerhard Koop. The turn-around device 29 further comprises a second rotary drum-shaped fluted conveyor 27a which receives one filter cigarette of each pair from the conveyor 27, a third rotary drum-shaped fluted conveyor 28 which receives the other filter cigarette of each pair from the conveyor 27, a fourth rotary drum-shaped fluted conveyor 28a, and a set of orbiting arms 29a which receive motion from a driving unit 29b.

The operation of the turn-around device 29 is as follows: The conveyor 27 receives pairs of coaxial filter cigarettes of unit length from successive flutes of the severing conveyor 26. One filter cigarette of each pair is delivered into the oncoming flute of the conveyor 28, whereas the other filter cigarette of each pair enters the oncoming flute of the conveyor 27a. Successive flutes of the conveyor 27a deliver the respective filter cigarettes of unit length to oncoming arms 29a which turn each filter cigarette end-for-end and deliver the inverted cigarettes into successive flutes of the conveyor 28a. The conveyor 28a delivers the inverted filter cigarettes of unit length into alternate flutes of the conveyor 28. It is to be noted that the conveyor 27 delivers successive non-inverted filter cigarettes of unit length into alternate flutes of the conveyor 28 so that the latter provides room for acceptance of inverted cigarettes from the conveyor 28a. The arrangement is preferably such that the conveyor 28a delivers inverted filter cigarettes of unit length into the spaces between successive pairs of non-inverted cigarettes on the conveyor 28. Thus, the conveyor 28 transports a single file of aligned filter cigarettes of unit length in a clockwise direction, as viewed in FIG. 1, and the filter plugs of all filter cigarettes on the conveyor 28 face in the same direction. Successive flutes of the conveyor 28 deliver successive filter cigarettes of unit length to a testing conveyor 31, for example, a conveyor of the type disclosed in commonly owned U.S. Pat. No. 3,962,906 granted June 15, 1976 to Uwe Heitmann et al. The cigarettes which are defective are segregated from satisfactory cigarettes on a rotary drum-shaped conveyor 32 which follows the testing conveyor 31 and may cooperate with an additional testing device which monitors the tobacco-containing ends of successive cigarettes. The cigarettes which are found to be defective by the testing unit including the conveyor 31 and/or by the testing unit including the conveyor 32 are segregated during travel past an ejecting device (not shown) of any known design, and the remaining (satisfactory) cigarettes of unit length are delivered onto the upper reach of an endless belt conveyor 36. The upper reach of the conveyor 36 cooperates with a braking roll 33 and this conveyor is trained over pulleys 34 of which only one is shown in FIG. 1. The upper reach of the conveyor 36 delivers satisfactory filter cigarettes of unit length into storage, directly to a packing machine, or into a reservoir system (e.g., a system of the type which is known as Resy and is manufactured and sold by the assignee of the present application).

The operation of the wrapping conveyor 22 and rolling device 23 will be understood upon perusal of the disclosure in commonly owned U.S. Pat. No. 3,483,873 or No. 3,527,234, both granted to Alfred Hinzmann.

The frame F further supports a spindle 114a for a fresh reel 14a of wrapping material 13a the leader of which is held at a splicing station SPL. When the supply of running web 13 on the reel 14 is nearly exhausted, a splicing device (not specifically shown) at the station SPL is actuated to attach the leader of the web 13a to the trailing portion of the web 13. A splicing device which can be used in the filter tipping machine of FIG. 1 is disclosed, for example, in commonly owned U.S. Pat. No. 3,730,811 granted May 1, 1973 to Hans-Joachim Wendt. The disclosures of all of the aforementioned commonly owned patents are incorporated herein by reference.

The driven parts of the filter tipping machine receive motion from a main prime mover M, e.g., a variable speed electric motor which can rotate the advancing rolls 16 and the suction conveyor 19 (i.e., the means for transporting the web 13 along an elongated path extending from the reel 14 to the transfer conveyor 12, namely, to the path for the groups of rod-shaped articles) at a plurality of different speeds.

The perforating apparatus 37 which is illustrated in detail in FIGS. 2, 3 and 4 comprises a main support or carrier 38 which is secured to the frame F of the filter tipping machine at a level below the paster 18. The support 38 carries six discrete perforating units or heads 39a, 39b, 39c and 41a, 41b, 41c which are disposed in two rows extending in substantial but not exact parallelism with the direction of travel of the web 13 toward the applicator 18a of the paster 18. The perforating units 39a, 39b, 39c which form one of the rows are staggered with reference to the perforating units 41a, 41b, 41c which form the other row, as considered in the longitudinal direction of the web 13.

The construction of each of the six perforating units 39a-39c and 41a-41c is the same. FIG. 3 shows the details of the perforating unit 41a which comprises a housing or casing 42. In the illustrated embodiment, the housing 42 constitutes an integral part of the carrier 38; however, it is equally within the purview of the invention to provide a discrete housing (e.g., a sleeve or cylinder) which is inserted into a bore or socket of the carrier 38. In other words, each of the six perforating units can be fully assembled independently of the carrier 38 prior to insertion into the carrier in an optimum orientation with reference to the path of movement of the web 13 along the perforating apparatus 37. The carrier 38 (and more particularly that portion of the carrier 38 which defines or constitutes the housing 42 of the perforating unit 41a) has a bore or socket 42a for component parts of the perforating unit 41a. Such parts include an annular frame or mount 45 for an optical element 46 which is a collector lens serving to make holes by focusing a laser beam 69b upon a selected portion of the running web 13. The mount 45 and the lens 46 can be said to constitute a window or inlet 43 which admits the laser beam 69b into a chamber 51 located downstream of the lens 46, as considered in the direction of propagation of the beam 69b toward the path of the web 13. The perforating unit 41a further includes a ring-shaped nozzle 47 which is inserted into the discharge end of the bore or socket 42a and defines a centrally located outlet opening or orifice 44 for the laser beam 69b. The aforementioned chamber 51 is located between the mount 45 and the nozzle 47 and communicates with a channel or port 52 for admission of compressed gas, e.g., air, from a suitable source 52A. Such source is preferably common to all six perforating units and may constitute a blower or fan which is normally provided in the filter tipping machine to supply compressed air to various component parts, for example, to the ports of rotary drum-shaped conveyors wherein compressed gas expels fragments of tobacco and/or other contaminants.

The perforating apparatus 37 further comprises a plate-like arcuate cover or shroud 48 which is disposed between the orifices 44 of nozzles 47 of the six perforating units 39a-39c, 41a-41c and the path of the web 13. The concave side of the shroud 48 faces the nozzles 47 and is spaced apart from the respective orifices 44, and the convex side of the shroud 48 serves as a guide for and can be contacted by one side of the web 13 which advances from the curling device 17 toward the paster 18 of the filter tipping machine. The convex external surface of the shroud 48 is smooth so that it offers little or negligible resistance to travel of the web 13 therealong. FIG. 3 shows one of the six apertures 49 which are provided in the shroud 48 to allow the respective laser beam 69b to penetrate through the shroud and to impinge upon the material of the running web 13 at intervals determined by means which controls pulsing of the laser L.

That portion of the web 13 which advances along the convex side of the shroud 48 is trained over the aforementioned guide rolls 73 and 73a which are sufficiently close to the respective ends of the shroud 48 (as considered in the longitudinal direction of the web 13) to ensure that the web portion between the guide rolls 73 and 73a hugs the convex surface of the shroud. This ensures that the web portion between the guide rolls 73, 73a is invariably maintained at a predetermined distance from the optical elements 46 of the six perforating units 39a-39c and 41a-41c, namely, at the foci of such optical elements. The guide rolls 73, 73a can be said to constitute or to form part of means (forming part of the filter tipping machine of FIG. 1) for transporting the web 13 past the perforating units 39a-39c and 41a-41c.

Figure 4:
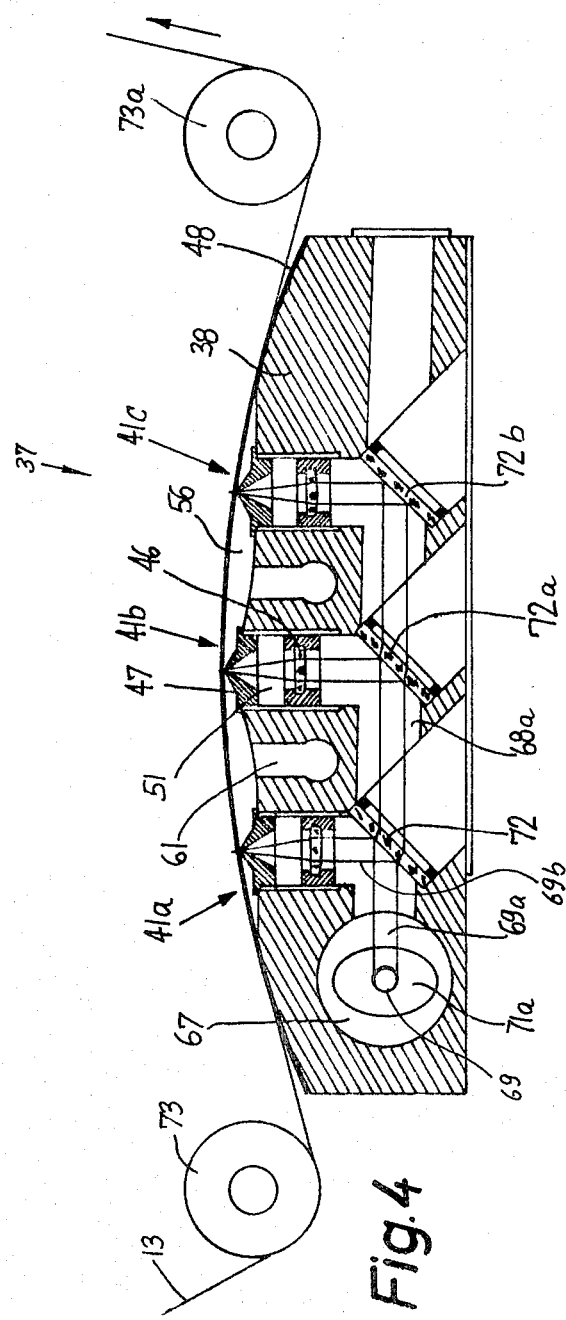
FIG. 4 is a longitudinal vertical sectional view as seen in the direction of arrows from the line IV—IV of FIG. 2.

FIG. 4 shows that the dimensions of the three perforating units 41a, 41b, 41c shown therein are identical. The same preferably holds true for the other three perforating units (39a-39c). In view of such identity of all six perforating units, the centrally located perforating units 39b and 41b are located at a level somewhat above the levels of the respective perforating units 39a, 39c and 41a, 41c in the same rows. This ensures that each of the six laser beams 69b is properly focused upon the web portion between the guide rolls 73 and 73a. It goes without saying that all of the six optical elements 46 can be located in a common plane if the optical elements of the median perforating units 39b and 41b are dimensioned and configured so as to focus the corresponding laser beams 69 upon the respective portions of the web 13 running from the guide roll 73 toward the guide roll 73a. In the illustrated embodiment, the six optical elements 46 can be said to be located in an arcuate plane whose radius of curvature is the same as that of the plane including the convex outer side of the shroud 48.

In the illustrated embodiment of the perforating apparatus 37, the carrier 38 is formed with two elongated parallel channels or tunnels 68 and 68a which extend in parallelism with the longitudinal direction of the web 13 between the guide rolls 73, 73a and are located at a level below the sockets or bores 42a for the component parts of the perforating units 39a-39c and 41a-41c. The tunnel 68 communicates with the lower end portions of sockets 42a for the perforating units 39a-39c, and the tunnel 68a communicates with the lower end portions of sockets 42a for the perforating units 41a-41c. The left-hand end portions of the tunnels 68, 68a communicate with a third tunnel 67 which is also machined into or otherwise formed in the carrier 38 and serves to admit a first or main laser beam 69 issuing from the laser L. The direction in which the undivided beam 69 enters the channel 67 is indicated by the arrow 74 (see FIG. 2).

The tunnels or channels 67 and 68, 68a contain means for splitting the beam 69 into six beams 69b, one for each of the six perforating units 39a-39c and 41a-41c. The beam splitting means includes two mirrors or reflectors 71 and 71a in the tunnel 67 and three mirrors or reflectors 72, 72a, 72b in each of the channels or tunnels 68, 68a. The mirror 71 reflects one-half (69a) of the beam 69 into the channel or tunnel 68 and transmits the other half (69a) of the beam 69 so that such other half impinges upon the totally reflecting mirror 71a and is reflected into the tunnel 68a. The first mirror 72 in the channel or tunnel 68 reflects one-third of the corresponding beam 69a into the socket 42a for the perforating unit 39a and allows two-thirds of the corresponding beam 69a to reach the second mirror 72a which reflects one-half of the impinging beam and permits the other half to impinge upon the mirror 72b. The mirrors 72a and 72b in the channel or tunnel 68 thereby reflect two beams 68b into the sockets 42a of the respective perforating units 39b and 39c. Analogously, the beam 69a which is totally reflected by the mirror 71a is reflected in part by the mirror 72 in the tunnel 68a, in part by the next-following mirror 72a in the tunnel 68a, and the remainder of such beam 69a is totally reflected by the mirror 72b in the tunnel 68a so that each of the perforating units 41a to 41c receives a beam 69b whose intensity is preferably the same as that of the beams 69b issuing from the orifices 44 of nozzles 47 forming part of the perforating units 39a–39c.

It will be recalled that the focal points of all six optical elements 46 are located in the plane of the web portion between the guide rolls 73 and 73a. This ensures that the perforating action of all six beams 69b is the same or at least closely approximates a preselected perforating action.

As already mentioned above, the shroud 48 is spaced apart from the orifices 44 of the six nozzles 47. This ensures that compressed air or another gas which is admitted into the chambers 51 can issue from the corresponding perforating units 39a–39c and 41a–41c to enter one of two elongated rectangular compartments 54 and 56 between the upper side of the carrier 38 and the concave inner side of the shroud 48. The compartment 54 communicates with the orifices 44 of nozzles 47 in the perforating units 39a–39c (see FIG. 2), and the compartment 56 communicates with the orifices 44 of the nozzles 47 forming part of the other row of perforating units 41a–41c. FIG. 2 further shows that the front, rear and lateral portions of the shroud 48 are secured to or at least sealingly contact the convex upper side of the carrier 38 so that the compartments 54 and 56 are at least substantially sealed from the surrounding atmosphere. The compartments 54 and 56 respectively communicate with pairs of suction ports 57 and 61 which are machined into or otherwise formed in the carrier 38. The discharge ends of the ports 57 and 61 respectively communicate with pairs of suction channels 58 and 62 of the carrier 38, and the discharge ends of the channels 58 and 62 respectively communicate with nipples 59 and 63 which are provided at the opposite lateral sides of the carrier 38 and are connected to a preferably common suction generating device (e.g., to the suction side of the blower or fan 52A which supplies compressed air to the channels or ports 52 discharging into the chambers 51 of the six perforating units). The connection between the ports 52 and the pressure side of the fan 52A comprises channels 64 and 66. The channel 64 communicates with the ports 52 for the chambers 51 of the perforating units 39a–39c, and the channel 66 communicates with the ports 52 for the chambers 51 of the perforating units 41a–41c. The reference characters 53 and 53' denote in FIG. 2 two nipples which are respectively connected with the inlet ends of the channels 66 and 64 in the carrier 38. The fan 52A can be said to form part of or to constitute a means for conveying gaseous fluid past those regions (of nozzles 47 and apertures 49) where the contaminants tend to accumulate when the apparatus 37 is in use.

The two compartments 54 and 56 can be replaced with a single compartment and one of the nipples 59, 63 can be omitted. It is further possible to provide a discrete compartment for each of the six perforating units, to provide a common compartment for each pair of perforating units, or to provide a larger compartment for four or five perforating units and a smaller compartment for the remaining perforating units or unit. The same holds true for the ports 52 which supply compressed gaseous fluid to the chambers 51 of the six perforating units, i.e., it is possible to connect all of these ports to a single nipple 53 or 53', to provide a discrete nipple for each of the six ports 52, and so forth.

It is further within the purview of the invention to employ a partially or greatly simplified carrier for the perforating units. For example, instead of utilizing a carrier which is formed with a large number of channels, ports, tunnels, chambers, compartments, etc., it is possible to employ a much simpler carrier which is connected with a large number of flexible and/or rigid conduits in the form of pipes or tubes serving to convey the beams 69, 69a, 69b, to supply streams of compressed air to the chambers 51, and/or to withdraw air from the compartments 54, 56 or directly from the regions at the outer ends of the six orifices 44. The illustrated carrier 38 is preferred at this time because, even though its design is somewhat complex, it contributes significantly to compactness of the improved perforating apparatus 37 so that the latter can be readily installed in existing filter tipping machines (or at least in many types of presently utilized filter tipping machines) wherein (as a rule) the space is at a premium. It is further clear that the perforating apparatus 37 need not be installed between the curling device 17 and the paster 18 but can be installed at any one of a number of other locations in or on the frame F of the filter tipping machine shown in FIG. 1 or an analogous filter tipping machine.

The operation of the perforating apparatus 37 is as follows:

When the filter tipping machine of FIG. 1 is in use, the web 13 advances along an elongated path from the reel 14 toward the suction conveyor 19 and overlies the convex surface of the shroud 48 between the guide rolls 73 and 73a. As explained above, the lowermost portions of the guide rolls 73 and 73a are sufficiently close to the levels of the adjacent portions of the convex surface of the shroud 48 to ensure that the web 13 hugs those portions of the shroud which are formed with the apertures 49 for the respective beams 69b of coherent radiation. The laser L is preferably a $CO_2$ laser which can be installed at the rear side of the frame F (namely, at that side which faces away from the observer of FIG. 1). This laser emits the undivided beam 69 which propagates itself in the direction of the arrow 74 and enters the channel or tunnel 67 of the carrier 38 to be thereupon split into two beams 69a by the mirrors 71, 71a and thereupon into the beams 69b by the corresponding mirrors 72, 72a and 72b. The mirrors 72, 72a and 72b in the tunnels 68, 68a direct the corresponding beams 69b into the respective sockets or bores 42a so that the beams 69b are focused by the optical elements 46, penetrate across the chambers 51, through the orifices 44 of the nozzles 47 and through the corresponding apertures 49 of the shroud 48 to impinge upon the running web 13 at a frequency which is selected by the frequency of the pulse generator for the laser L. Such frequency, plus the speed of the web 13 in a direction from the guide roll 73 toward the guide roll 73a, determines the number of holes or perforations P in the web 13, i.e., the distances between the neighboring perforations P. FIG. 2 shows that the perforating units 39a–39c and 41a–41c of the two rows are slightly staggered with reference to each other, as considered at right angles to the direction (arrow D) of advancement of the web 13, so that the six beams 69b form two groups 75 and 75a of three parallel files of perforations P each. When a filter plug of double unit length is severed by the rotary disc-shaped knife 26a of the filter tipping machine shown in FIG. 1, the severing plane is located between the groups 75 and 75a so that the tubular wrapper (convoluted half of the uniting band) of each of the resulting filter plugs of unit length is formed with three annuli of perforations P.

The pressure side of the fan 52A supplies compressed air to the nipples 53 and 53' which, in turn, admit streams of compressed air into the respective channels 66 and 64 for admission into the associated ports 52 which lead to the respective chambers 51. Instead of air, the fan 52A can circulate another neutral gas, e.g., a protective gas of the type normally employed in connection with laser beams or nitrogen which reduces the likelihood of combustion of web 13 under the action of beams 69b when the web consists of or contains readily combustible material. The compressed gas which enters a chamber 51 issues from such chamber by way of the orifice 44 of the associated nozzle 47 to enter the corresponding compartment 54 or 56 between the carrier 38 and the shroud 48. The streams of compressed gas which flow continuously from the chambers 51 into the corresponding compartments 54 and 56 uninterruptedly clean the nozzles 47 by entraining impurities which are likely to accumulate in the orifices 44 and tend to clog the corresponding nozzles 47 and/or apertures 49 of the shroud 48. The gaseous fluid which accumulates in the compartments 54, 56 is evacuated by way of the corresponding suction ports 57, 61, suction channels 58, 62 and nipples 59, 63 and can be caused to pass through one or more filters or other intercepting means prior to reaching the suction side of the fan 52A. The filter or filters between the outlets of the nipples 59, 63 and the suction side of the fan 52A ensure that the impurities which are withdrawn from the compartments 54, 56 cannot be admitted into the chambers 51. It is clear that the filters are not absolutely necessary if the fan 52A merely serves to evacuate contaminated (impurities-containing) gases from the compartments 54, 56 and the apparatus 37 or the filter tipping machine comprises a separate source of compressed gas which delivers compressed gaseous fluid to the nipples 53 and 53'.

It has been found that the improved perforating apparatus 37 (and more specifically the means for circulating a stream of compressed gaseous fluid along a portion of the path for each of the six beams 69b) reliably prevents malfunctioning by removing any and all impurities which would normally tend to accumulate in the nozzles 47 and/or in the apertures 49 to thereby interfere with the formation of perforations P having an optimum size and/or shape. In addition, the streams of relatively cool gaseous fluid which are admitted into the chambers 51 and flow from these chambers, through the respective orifices 44 and into the associated compartments 54, 56 exchange heat with the optical elements 46 and other components of the perforating units 39a–39c and 41a–41c. Still further, a portion of each of the just discussed streams of relatively cool gaseous fluid penetrates through the corresponding aperture 49 of the shroud 48 to flow along the convex side of the shroud and form a thin cushion of gaseous fluid which reduces the extent of frictional contact between the underside of the web 13 and the shroud. It goes without saying that the pressure of compressed air in the chambers 51, the diameters of the orifices 44 and the diameters of the apertures 49 are selected with a view to ensure that the gaseous fluid which is free to penetrate between the web 13 and the convex side of the shroud 48 does not lift the web 13 well off and above the shroud so that the web portion between the guide rolls 73 and 73a remains in the focal planes of the optical elements 46. In fact, the quantity of compressed gaseous fluid which issues via apertures 49 can be readily selected with a view to actually ensure that the web portion between the rolls 73 and 73a is located at an optimum distance from all six optical elements 46. Proper guidance of the web portion between the guide rolls 73 and 73a is advisable and advantageous for the aforediscussed reasons, i.e., primarily to ensure the formation of perforations P having an optimum size and shape so that the permeability of the perforated web can be calculated in advance with a high degree of reliability and reproducibility.

As pointed out hereinabove, the improved perforating apparatus can be used with advantage in or on a filter tipping machine. However, it is clear that such apparatus can be used with equal or nearly equal advantage in other types of machines which process or manufacture smokers' products. For example, it is possible to utilize the apparatus 17 in a cigarette rod making machine wherein the apparatus forms one or more rows or files of perforations in a continuous web of cigarette paper, i.e., in the material which is used to confine a continuous tobacco filler before the resulting cigarette rod is severed to yield a succession of discrete plain cigarettes of unit length or multiple unit length. Furthermore, the improved perforating apparatus or an analogous apparatus can be used with equal advantage to form perforations in webs of material which is not utilized in connection with the making and/or processing of smokers' products. Such material may be paper, cardboard, cellophane, a web or foil of synthetic plastic material or a combination of such substances or bodies (e.g., a laminate consisting of two or more layers). Also, the number of perforating units can be reduced to one, two, three, four or five, or increased to seven or more without departing from the spirit of the invention.

Furthermore, the apparatus can be equipped with different means for causing currents of air or another gas to flow from the chambers 51 into the compartments 54, 56 and from such compartments to the atmosphere or for recirculation into the chambers 51. Thus, whereas the illustrated apparatus utilizes means for supplying air at superatmospheric pressure into the chambers 51 and for maintaining in the compartments 54, 56 a pressure which is below atmospheric pressure, it is also possible to simply connect the compartments 54, 56 to a suction generating device and to connect the bores or ports 52 with the atmosphere. Also, it is possible to connect the bores 52 with a source of compressed air and to provide outlets for escape of air from the compartments 54, 56 into the surrounding atmosphere. All that counts is to ensure that the pressure differential between the interior of each chamber 51 and the interior of the corresponding or associated compartment 54 or 56 suffices to ensure that currents of air will flow in directions to entrain contaminants from the region of apertures 49 and to thus ensure long-lasting uninterrupted satisfactory operation of the perforating apparatus. The solution which is shown in the drawing has been found to be especially satisfactory because it increases the likelihood of removal of any and all contaminants which, in the absence of pronounced currents of air, would deposit on the shroud 48 and/or in the nozzles 47 and/or in the ports leading to the chambers 51 and/or from the compartments 54 and 56. Moreover, the currents of air keep the contaminants away from the optical elements 46 and ensure adequate cooling of the perforating units. Guidance of currents of air through the carrier 38 as well as the provision of channels 67 and 68 for the radiation beams in the carrier 38 contributes to compactness of the improved apparatus but, and as already mentioned above, the apparatus can be readily designed to reduce the number of ports, channels and other cavities in the carrier 38 by resorting to conduits which supply air to the chambers, which withdraw air from the compartments, and which convey the beams of coherent radiation close to or directly into the optical elements of the perforating units.

The illustrated carrier 38 is preferred at this time on the additional ground that it enhances the safety of the perforating apparatus 37 because the laser beams 69, 69a and 69b are not exposed and cannot cause injury to attendants. The path for the beam 69 is closed all the way from the laser L to the channel or tunnel 67 so that the beams 69, 69a and 69b are fully confined at all times.

Figure 5:
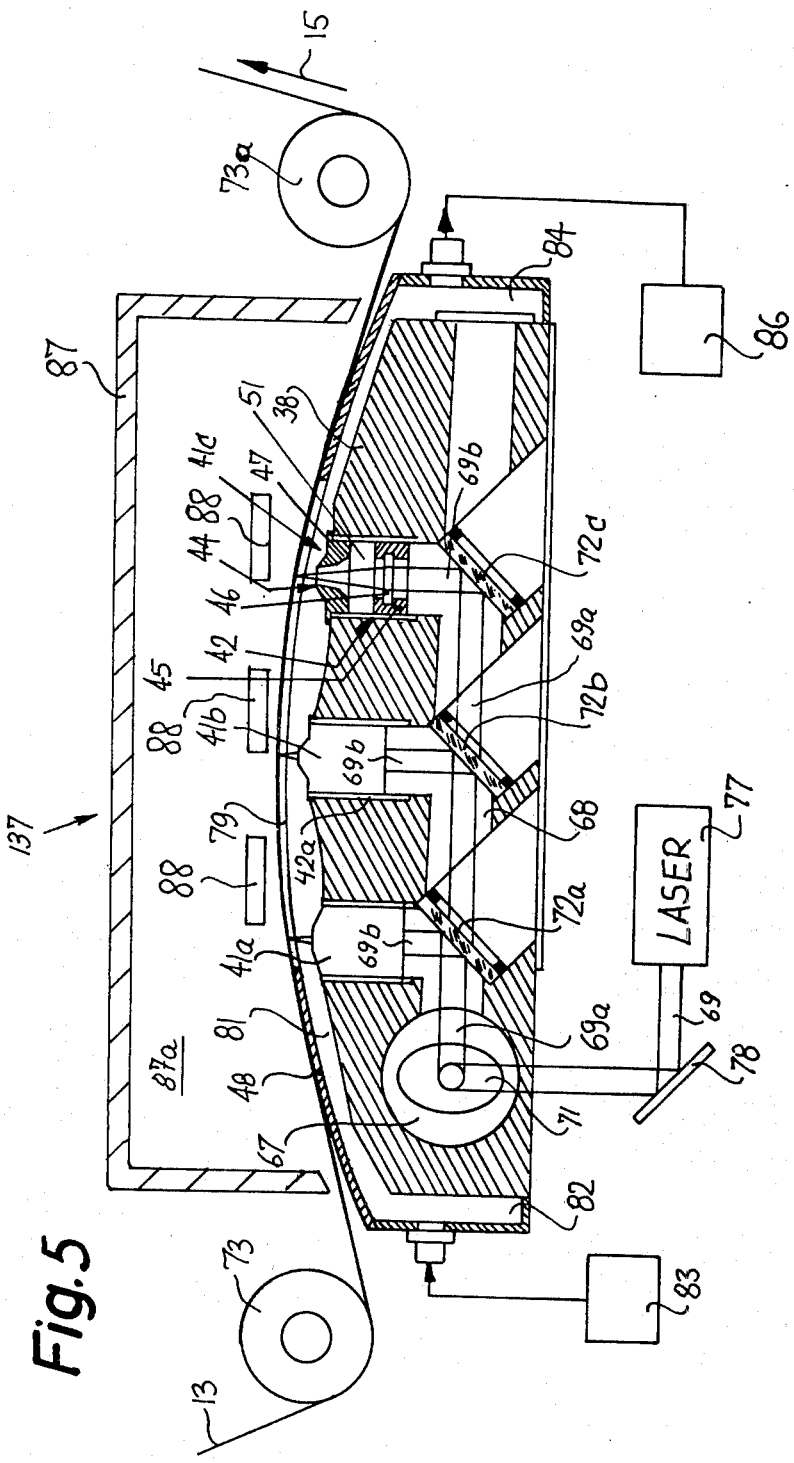
FIG. 5 is a fragmentary longitudinal vertical sectional view of a modified perforating apparatus.

The modified perforating apparatus 137 of FIGS. 5 and 6 can be used for the making of rows or files of perforations P in a running web 13 of tipping paper, e.g., in the filter tipping machine of FIG. 1. However, the apparatus 137 can be used with equal advantage in many other types of machines for the production of plain or filter tipped cigarettes or analogous rod-shaped smokers' products. This apparatus, the same as the apparatus 37 of FIGS. 2 to 4, can be used for the making of perforations P in webs which consist of paper, imitation cork, cardboard, cellulose, other synthetic plastic materials or the like. All such parts of the apparatus 137 of FIGS. 5 and 6 which are identical with or clearly analogous to corresponding parts of the apparatus 37 shown in FIGS. 2 to 4 are denoted by similar reference characters.

The web 13 is advanced along an elongated path in the direction of arrow 15. Such path is defined in part by two spaced-apart guide rolls 73 and 73a, and in part by the convex outer side of a shroud 48 which is mounted on a carrier or main support 38. The latter contains a plurality of perforating units including a first series or row of units 39a, 39b, 39c and a second series or row of perforating units 41a, 41b and 41c. Each of the perforating units 39a-39c and 41a-41c comprises a housing 42 which forms an intergral part of the carrier 38 but can constitute a discrete element which is removably or more or less permanently installed in the carrier 38. Each housing 42 has a bore 42a for a ring-shaped frame or mount 45 which surrounds an optical element here shown as a collector lens 46. That portion of the bore 42a which is located below the respective lens 46 can be said to constitute a radiation admitting inlet of the corresponding housing 42. The ring-shaped nozzles 47 of the perforating units are disposed above the respective lenses 46, as viewed in FIG. 5, and each thereof defines the radiation discharging outlet opening 44 of the corresponding housing 42. Each lens 46 defines with the associated nozzle 47 a chamber 51 which receives compressed gaseous fluid (e.g., air) by way of a conduit or port 52. The ports 52 communicate with a source 76 of compressed gaseous fluid (see FIG. 6).

FIG. 6 shows that the two rows of outlet openings 44 are substantially parallel to the direction of lengthwise movement of the web 13 and that the openings 44 of each row are disposed one behind the other, as considered in the direction of the arrow 15. Furthermore, the openings 44 of one row are staggered with reference to the openings of the other row, as considered transversely of the direction of lengthwise movement of the web 13. It goes without saying that, if necessary, the apparatus 137 which is shown in FIGS. 5 and 6 can have more than two rows of perforating units or a single row of such units; this depends on the desired number of groups of perforations or holes P (FIG. 6 shows two groups 75 and 75' which extend lengthwise of the web 13 and are respectively formed by the perforating units 41a–41c and 39a–39c).

The bores 42a of the housings 42 forming part of the perforating units 39a–39c communicate with a first elongated tunnel or channel 68' which is machined into or otherwise formed in the carrier 38 and extends in parallelism with the longitudinal direction of the web 13. The channel 68' is parallel with a second channel or tunnel 68 which is also provided in the carrier 38 and communicates with the lower end portions of bores 42a in the housings 42 of perforating units 41a–41c. The left-hand end portions of the channels 68, 68' communicate with a channel or tunnel 67 which is machined into the carrier 38 and serves for admission of a first or main (undivided) laser beam 69 issuing from a source 77 of coherent radiation. The beam 69 is deflected by a totally reflecting mirror 78 which is interposed between the source 77 and the inlet of the tunnel 67. The tunnel 67 contains a partially reflecting first mirror 71' which splits the beam 69 into two equal beams 69a. One of the beams 69a is deflected into the channel 68', and the other beam 69a passes through the mirror 71' and impinges upon a totally reflecting second mirror 71 which directs the other beam 69a into the channel 68.

Each of the channels 68 and 68' contains three spaced-apart mirrors including two partially reflecting mirrors 72a, 72b and a totally reflecting mirror 72c. The mirror 72a in the channel 68 deflects one-third of the other beam 69a into the perforating unit 41a, the mirror 72b deflects one-half of the remaining two-thirds of the other beam 69a into the perforating unit 41b, and the mirror 72c deflects the remainder of the other beam 69a into the perforating unit 41c. The nature and distribution of mirrors in the channel 68' are the same as in the channel 68, i.e., each of the perforating units 39a, 39b, 39c receives one-third of the one beam 69a. The lenses 46 of the perforating units 39a–39c and 41a–41c focus the respective beams in the plane of the running paper web 13, i.e., at the convex outer side of the shroud 48. In other words, the foci of all six lenses 46 are located in the plane of the web 13 between the guide rolls 73 and 73a at the convex side of the shroud 48. This ensures that the apparatus 137 can make perforations P with a high degree of reproducibility.

In accordance with a feature of the apparatus 137 which is shown in FIGS. 5 and 6, the apertures 79 and 79' of the shroud 48 are elongated slots, one for each of the two rows of perforating units. The slot 79 extends forwardly and beyond the outlet opening 44 of the foremost perforating unit 41a, and the slot 79' extends forwardly and beyond the outlet opening 44 of the foremost perforating unit 39c. The slots 79 and 79' are at least substantially parallel to each other and substantially parallel to the direction of lengthwise movement of the web 13, and each of these slots is sufficiently long to allow three beams 69b to pass therethrough and to impinge upon the running web 13.

The concave side of the shroud 48 is spaced apart from the adjacent convex side of the carrier 38 so that these parts define a pair of elongated channels or compartments 81 and 81', one for each of the two rows of perforating units. The channels 81 and 81' are parallel to each other and to the direction of lengthwise movement of the web 13. The outlet openings 44 of housings 42 of the perforating units 39a-39c communicate with the channel 81', and the outlet openings 44 of housings 42 of the perforating units 41a-41c communicate with the channel 81. These channels further communicate with the respective slots 79 and 79'. The left-hand or inlet portions of the channels 81 communicate with a plenum chamber 82 which is connected with a source 83 of compressed gaseous fluid, preferably air. The right-hand end portions of the channels 81 and 81' communicate with a suction chamber 84 which is connected with a suction generating device 86. The chambers 82 and 84 are machined into or otherwise formed in the carrier 38. The source 83 may be provided in addition to or it may replace the source 52A shown in FIG. 2.

The rolls 73 and 73a cooperate with the convex side of the shroud 48 to ensure that the underside of the running web 13 always engages and slides along the shroud, i.e., that the web portion between the rolls 73 and 73a is always located in the focal planes of the lenses 46.

That side of the running web 13 which faces away from the shroud 48 faces the suction chamber 87a of an enclosure 87 which cooperates with the shroud 48 and/or with the carrier 38 to ensure that the chamber 87a is at least substantially sealed from the surrounding atmosphere. The enclosure 87 has one or more suction ports 88 which are connected with the suction generating device 86 or with a discrete (additional) suction generating device to ensure the evacuation of air from the chamber 87a. This automatically entails evacuation of contaminants which penetrate into the chamber 87a when the apparatus 137 is in use. Such contaminants constitute fragments of charred paper and, in the absence of suction chamber 87a, could tend to accumulate at the edges of the slots 79 and 79' to eventually constrict the passages for the propagation of radiation (beams 69b) to the running web 13. The enclosure 87 is or can be supported by the carrier 38.

Figure 2:
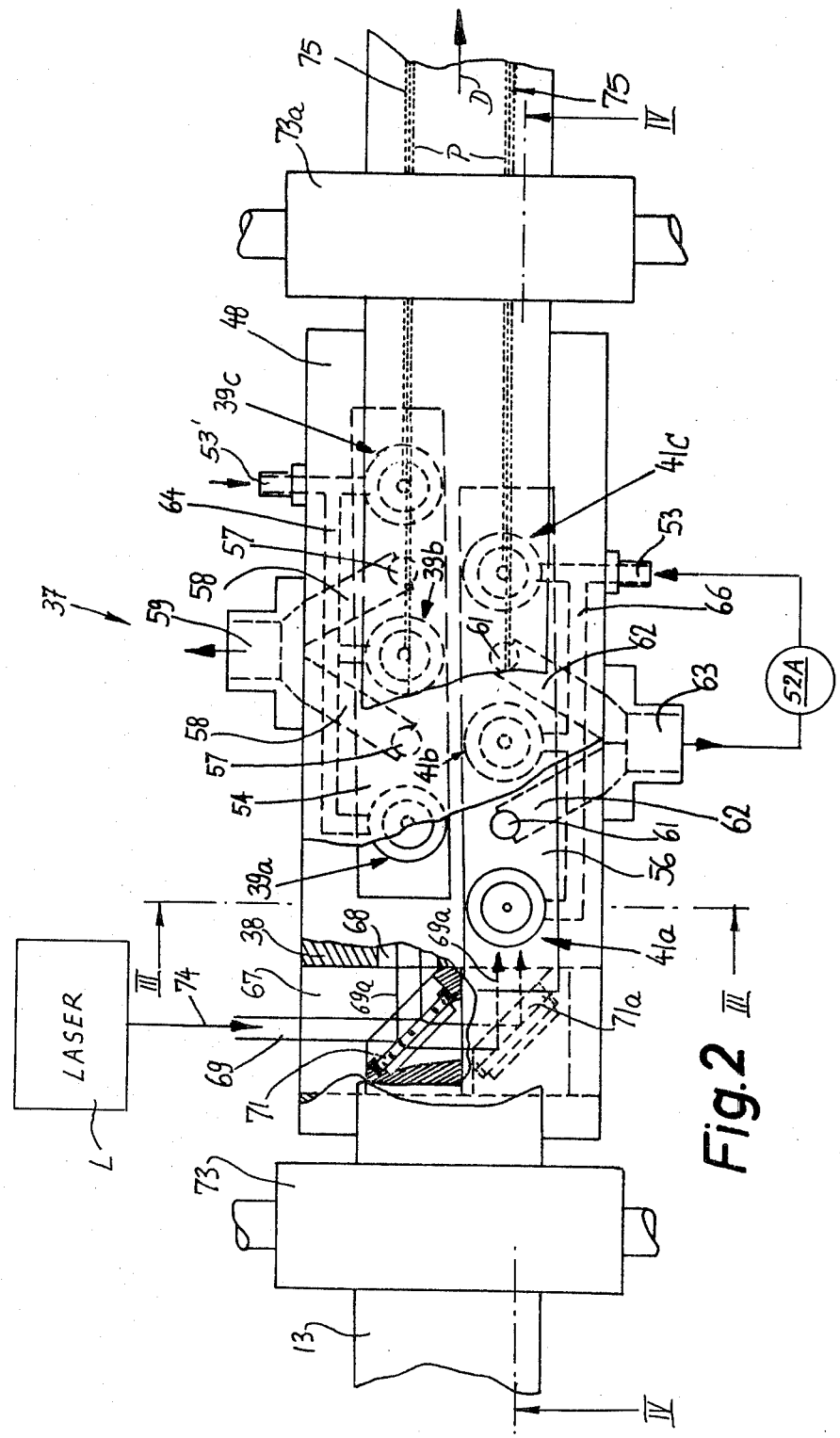
FIG. 2 is a greatly enlarged plan view of the perforating apparatus, substantially as seen in the direction of arrow II in FIG. 1.
Figure 3:
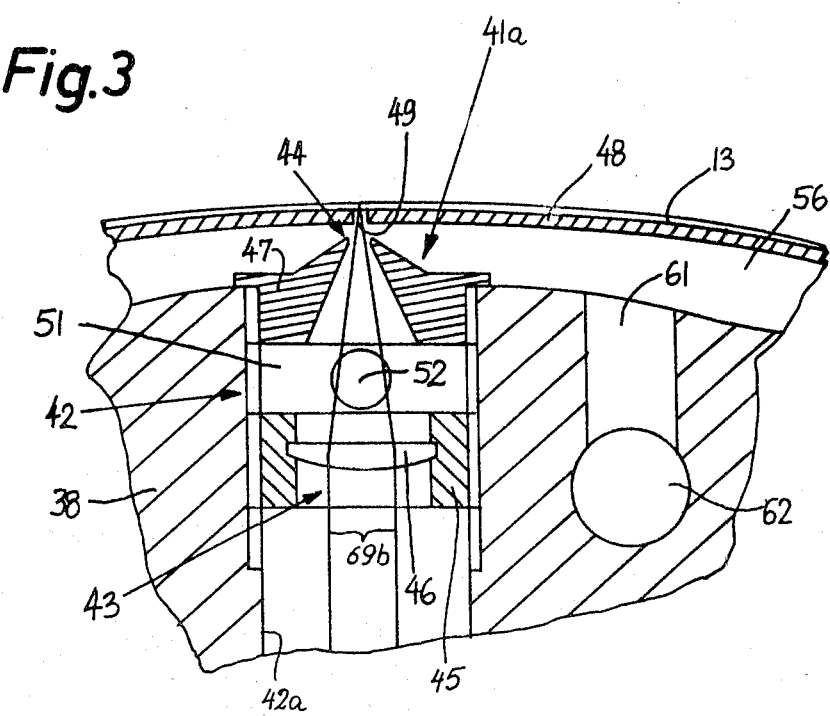
FIG. 3 is a transverse vertical sectional view as seen in the direction of arrows from the line III—III of FIG. 2.

The operation of the apparatus which is shown in FIGS. 5 and 6 is analogous to that of the apparatus which is shown in FIGS. 2 to 4. When the web 13 is driven to advance in the direction of arrow 15, the web portion between the guide rolls 73 and 73a hugs the convex surface of the shroud 48 so that it is located at an optimum distance from the lenses 46 of all six perforating units 39a-39c and 41a-41c. The pulse frequency of the laser 77 is preferably adjustable and the beam 69 which issues therefrom is split and oriented in the aforementioned manner so that each of the six lenses 46 focuses a beam 69b of coherent radiation upon the running web 13 at a preselected frequency to thereby ensure the formation of six files of perforations P, i.e., a first group 75 of three files and a second group 75' of three files. The formation of three files in each group is attributable to slight inclination of the two rows of perforating units with reference to the direction of lengthwise transport of the web 13. The spacing between the perforations P in each file can be selected by appropriate adjustment of the pulse frequency of the laser 77 and the speed of lengthwise movement of the web 13.

The source 76 of compressed gaseous fluid is connected with the ports 52 for admission of such fluid into the chambers 51. The streams of compressed gaseous fluid flow through the outlet openings 44 and merge into the streams of gaseous fluid flowing from the source 83, via corresponding channels or compartments 81, 81' and into the suction chamber 84. The gaseous fluid which is supplied by the source 83 and/or 76 may be air or a protective gas, and the rate of flow of such fluid in the channels 81, 81' is sufficient to ensure adequate cooling of the perforating units by air which is supplied by the source 76 as well as the removal of contaminants from the underside of the shroud 48 by air which is supplied by the sources 76 and 83 so that such air invariably prevents accumulation of contaminants at the underside of the shroud 48, especially at edges surrounding the slots 79 and 79'. It will be noted that those contaminants which develop during the making of perforations P and enter the channels 81, 81' are conveyed into the suction chamber 84 whereas the contaminants which enter the chamber 87a are evacuated via suction ports 88 (into the suction chamber 84, directly to the suction generating device 86, or to a discrete suction generating device, not shown). Such arrangement prevents clogging of outlet openings 44 (in view of the flow of air streams through the perforating units) as well as clogging of the apertures 79, 79' in view of the flow of air streams at both sides of the shroud 48. Therefore, the apparatus 137 is highly unlikely to exhibit a tendency to malfunction. Moreover, the apparatus 137 requires less frequent cleaning and/or inspection because the likelihood of clogging is greatly reduced or non-existent.

It has been found that the replacement of relatively small apertures with elongated slot-shaped apertures 79, 79' contributes greatly to reliability of the apparatus 137 and to a greatly reduced maintenance cost. These slot-shaped apertures reduce the likelihood of clogging of the outlet openings 44 as well as the likelihood of clogging of the shroud 48. Clogging of the shroud 48 (i.e., of the apertures or slots 71, 71') is highly unlikely in view of the provision of channels 81, 81' at one side and of the suction chamber 87a at the other side of the path for the web 13. The arrangement is preferably such that the flow of air through the channels 81, 81' and from the suction chamber 87a is constant, i.e., such streams flow as long as the apparatus 137 is in use. The quality of perforations P is very satisfactory because the condition of the apparatus 137 is less likely to change than that of the apparatus 37 shown in FIGS. 2 to 4, i.e., the apparatus 137 of FIGS. 5-6 will produce perforations P of predictable size for long periods of time, even in the absence of frequent or regular inspection and/or cleaning.

The feature that the front end portions of the slot-shaped apertures 79 and 79' extend forwardly (toward the guide roll 73a) and beyond the outlet openings 44 of foremost perforating units 41c and 39c in the respective rows further reduces the likelihood of accumulation of minute or larger contaminants at the edges around the apertures. As a rule, the quality of perforations P will remain unchanged in the absence of contamination of lenses 46, clogging of the outlet openings 44 and/or partial or complete clogging of the apertures 79 and 79'.

The shroud 48 of FIGS. 5 and 6 exhibits the additional advantage that it can be machined at a lower cost than the shroud which is used in the apparatus 37 of FIGS. 2 to 4. This is due to the fact that, at least in many instances, the two slot-shaped apertures 79 and 79' can be machined at a lower cost than six discrete apertures (see FIG. 2) each of which must be in exact register with the associated outlet opening.

The source 83 of compressed gas can be omitted, i.e., it is also possible to simply draw streams of air or another gas through the channels or compartments 81, 81' by suction. Furthermore, it is possible to replace the source 83 and the suction generating device 86 with a single device having a suction intake connected to the chamber 84 and an outlet which admits compressed gas into the plenum chamber 82. Such arrangement allows for circulation of two air streams (via channels 81 and 81') along two closed paths.

When compared with the apparatus 37, the apparatus 137 exhibits the important additional advantage that it not only cools the lenses 46 and reduces the likelihood of rapid contamination of such lenses and/or clogging of the outlet openings 44, but that it further ensures that the shroud 48 is even less likely to accumulate contaminants than the corresponding component of the apparatus 37.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for making holes in a sheet-like material, particularly in a running web of wrapping material for rod-shaped articles which constitute or form part of smokers' products, comprising at least one perforating unit having at least one source of coherent radiation arranged to furnish at least one beam of coherent radiation and means for making holes in the sheet-like material including means for focusing the beam upon the sheet-like material with attendant development of contaminants and the tendency of such contaminants to accumulate in the space accommodating and surrounding said unit; and means for conveying at least one stream of gaseous fluid through said space so that the conveyed fluid entrains and removes contaminats from such space.

2. The apparatus of claim 1, wherein said unit further comprises a housing for said hole making means, said housing having radiation admitting inlet means and radiation discharging outlet means, and further comprising a shroud interposed between said unit and the sheet-like material and having an aperture in register with said outlet means.

3. The apparatus of claim 2, wherein said housing has a chamber communicating with said outlet means, said housing and said shroud defining at least one compartment communicating with said outlet means, said conveying means including means for circulating at least one stream of gaseous fluid from said chamber into said compartment by way of said outlet means.

4. The apparatus of claim 3, wherein said housing is a closed housing and is further provided with means for admitting gaseous fluid to said chamber, and further comprising means for permitting evacuation of gaseous fluid from said compartment.

5. The apparatus of claim 4, wherein said shroud is spaced apart from said outlet means.

6. The apparatus of claim 5, further comprising carrier means for said housing and said shroud.

7. The apparatus of claim 4, wherein said circulating means includes means for establishing a pressure differential between said fluid admitting means and said evacuation permitting means.

8. The apparatus of claim 1, further comprising a carrier and at least one additional perforating unit, said units having housings in said carrier.

9. The apparatus of claim 8, wherein each of said housings has radiation admitting inlet means, radiation discharging outlet means and a chamber communicating with the respective outlet means, and further comprising a shroud disposed between said units and the sheet-like material and having apertures in register with said outlet means, said shroud and said housings defining at least one compartment communicating with said outlet means and said conveying means including means for circulating gaseous fluid from the chambers of said housings into said compartment by way of the respective outlet means.

10. The apparatus of claim 9, wherein said radiation source includes a laser arranged to emit a beam of coherent radiation and further comprising means for splitting said beam into discrete beams, one for each of said units, and for directing the discrete beams into the radiation admitting inlet means of the respective housings.

11. The apparatus of claim 10, wherein said housings have means for admitting gaseous fluid into the respective chambers and said carrier has at least one port for evacuation of fluid from said compartment, said circulating means including means for establishing a pressure differential between the fluid admitting means of said housings and said port so that streams of gaseous fluid flow from said fluid admitting means, through the respective chambers and outlet means, and into and from said compartment.

12. The apparatus of claim 1, wherein said sheet-like material is a continuous web and further comprising means for transporting the web lengthwise along a predetermined path, carrier means adjacent to one side of said path and a plurality of additional perforating units, said units being installed in said carrier means and forming at least one row extending in substantial parallelism with the longitudinal direction of the web in said path.

13. The apparatus of claim 12, wherein said units form a plurality of rows and wherein the units of each of said rows are staggered with reference to each other, as considered transversely of said path.

14. The apparatus of claim 13, further comprising means for splitting said beam into a plurality of discrete beams, one for each of said units, and for directing the discrete beams to the respective units, each of said units having a housing provided with radiation admitting inlet means, radiation discharging outlet means and a chamber communicating with the respective outlet means, and further comprising a shroud interposed between said units and said path and having apertures in register with said radiation discharging outlet means so that the discrete beams can be focused upon the web in said path, said shroud and said carrier means defining a plurality of compartments, one for each of said rows and each communicating with the outlet means of the housings in the respective row, said conveying means including means for establishing a pressure differential between each of said compartments and the chambers of the units in the respective row so that streams of gaseous fluid flow from said chambers, through the respective outlet means and into the corresponding compartments.

15. The apparatus of claim 14, wherein the number of said rows equals two and each of said rows comprises three units.

16. The apparatus of claim 14, wherein said carrier means has first port means for admission of gaseous fluid to said chambers and gas evacuating second port means communicating with said compartments.

17. The apparatus of claim 16, further comprising a plurality of gas admitting channels provided in said carrier means, one for each of said rows and each arranged to admit gaseous fluid to the respective first port means.

18. The apparatus of claim 1, further comprising a housing for said unit and a shroud interposed between the sheet-like material and said housing, said housing having a chamber and an outlet communicating with said chamber, said housing and said shroud defining at least one compartment communicating with said outlet and said conveying means comprising means for admitting a gaseous fluid at a first pressure into said chamber and means for maintaining the interior of said compartment at a second pressure below said first pressure so that the fluid which is admitted into said chamber flows into said compartment by way of said outlet.

19. The apparatus of claim 18, wherein said first pressure exceeds and said second pressure is less than atmospheric pressure.

20. The apparatus of claim 1, further comprising a carrier and a plurality of additional perforating units, said carrier having channel means with inlet means for said one beam and means provided in said channel means for splitting said one beam into discrete beams, one for each of said units, and for directing the respective discrete beams against the corresponding focusing means.

21. The apparatus of claim 20, wherein said units form a plurality of rows and said channel means includes a first channel arranged to receive said one beam from said source and a plurality of additional channels, one for each of said rows and each communicating with said first channel, said beam splitting means including first reflector means provided in said first channel to split said one beam into a plurality of second beams and to direct each second beam into a discrete second channel, and second reflector means provided in said second channels, one for each unit of the respective row and each arranged to split the respective second beam into discrete beams and to direct the thus obtained discrete beams against the respective focusing means.

22. The apparatus of claim 20, wherein said beam splitting means comprises at least one partially reflecting and at least one totally reflecting reflector.

23. The apparatus of claim 1, wherein said sheet-like material is an elongated web and further comprising means for transporting the web along a predetermined path and a shroud interposed between said path and said unit, said shroud having a slide surface defining a portion of said path.

24. The apparatus of claim 23, wherein said slide surface is of arcuate shape.

25. The apparatus of claim 24, wherein said arcuate surface is a convex surface and said transporting means includes means for maintaining the web in contact with said convex surface.

26. The apparatus of claim 1, said unit comprises a housing having a radiation admitting inlet and a radiation discharging outlet, said focusing means comprising an optical system disposed in said housing between said inlet and said outlet and arranged to focus coherent radiation entering via said inlet upon the sheet-like material by way of said outlet.

27. The apparatus of claim 26, wherein said optical system comprises a collector lens having a focus located in the plane of the sheet-like material.

28. The apparatus of claim 27, wherein the sheet-like material is a continuous web and further comprising means for transporting the web past said unit so that successive increments of the running web are located in said plane.

29. The apparatus of claim 1, further comprising a carrier for said unit and means for directing coherent radiation from said source to said carrier, said carrier having a socket for said unit and said unit having a radiation admitting inlet defined by a window including said focusing means, said focusing means including optical means for focusing radiation upon the sheet-like material and said unit further having a nozzle defining a radiation discharging outlet interposed between said optical means and the sheet-like material.

30. The apparatus of claim 29, wherein said unit has a chamber intermediate said optical means and said nozzle, said conveying means including means for admitting gaseous fluid into said chamber and said chamber communicating with said outlet.

31. The apparatus of claim 30, wherein said fluid admitting means includes channel means provided in said carrier.

32. The apparatus of claim 1, wherein said source includes a laser.

33. The apparatus of claim 1, wherein the sheet-like material is a web of wrapping material for use in a machine for the processing of commodities which constitute or form part of smokers' products, and further comprising means for transporting the web past said unit, said transporting means forming part of the processing machine.

34. The apparatus of claim 1, further comprising means for transporting the web lengthwise in a predetermined direction and along a predetermined path, and a shroud interposed between said unit and said path and having an elongated slot for said beam, said slot extending in said predetermined direction.

35. The apparatus of claim 34, wherein said unit further comprises a housing for said hole making means, said housing having radiation admitting inlet means and radiation discharging outlet means, said slot extending beyond said outlet means, as considered in said predetermined direction.

36. The apparatus of claim 35, further comprising at least one additional perforating unit, the outlet means of the housings of said units forming a row extending substantially in said predetermined direction and said slot overlying the outlet means of said housing.

37. The apparatus of claim 35, further comprising a plurality of additional perforating units, the outlet means of the housings of said units forming several rows extending substantially in said predetermined direction and said shroud having several elongated slots, one for each of said rows and each overlying all outlet means of the respective row.

38. The apparatus of claim 37, wherein the outlet means of one of said rows are staggered with reference to the outlet means of a neighboring row, as considered transversely of said direction.

39. The apparatus of claim 35, wherein said housing and said shroud define a channel communicating with said outlet means and said slot, said conveying means comprising means for conveying a stream of gaseous fluid through said channel.

40. The apparatus of claim 39, wherein said channel is elongated and extends in substantial parallelism with said predetermined direction.

41. The apparatus of claim 40, further comprising at least one additional perforating unit, said source of coherent radiation being arranged to furnish a beam of coherent radiation to each of said units, the outlet means of the housings of said units forming a row extending in substantial parallelism with said direction and each of said outlet means communicating with said channel.

42. The apparatus of claim 34, wherein the web in said path has a first side engaging said shroud and a second side facing away from said shroud, and further comprising an enclosure defining a chamber at said second side of the web, said enclosure having at least one suction port for evacuation of air from said enclosure so that contaminants which penetrate into said chamber during the making of holes in the web are evacuated from the enclosure.

43. The apparatus of claim 42, wherein said unit comprises a housing, said enclosure and said shroud being mounted on said housing.

44. Apparatus for making holes in a sheet-like material, particularly in a running web of wrapping material for rod-shaped articles which constitute or form part of smokers' products, comprising means for positioning the material which is to be provided with holes; at least one source of coherent radiation arranged to furnish at least one beam of coherent radiation; a plurality of perforating units each having means for focusing the beam upon the sheet-like material; and carrier means for supporting said perforating units in predetermined positions with reference to said positioning means.

45. The apparatus of claim 44, wherein each of said perforating units comprises a housing having radiation admitting inlet means and radiation discharging outlet means, said housings being disposed in said carrier means.

46. The apparatus of claim 44, further compirsing a shroud interposed between said carrier means and the sheet-like material and having apertures in register with the outlet means of said perforating units.

47. The apparatus of claim 46, wherein said shroud is spaced apart from said outlet means.

48. The apparatus of claim 44, wherein each of said perforating units comprises a housing having radiation admitting inlet means and radiation discharging outlet means, said housings being disposed in said carrier means and said radiation source including a laser arranged to emit a beam of coherent radiation, and further comprising means for splitting said beam into discrete beams, one for each of said perforating units, and for directing the discrete beams into the radiation admitting inlet means of the respective housings.

49. The apparatus of claim 44, wherein the sheet-like material is a continuous elongated web and said positioning means comprises means for transporting the web lengthwise along a predetermined path, said carrier means being adjacent to one side of said path and said perforating units forming at least one row extending in substantial parallelism with the longitudinal direction of the web in said path.

50. The apparatus of claim 49, wherein the perforating units of said row are staggered with reference to each other, as considered transversely of said path.

51. The apparatus of claim 49, wherein said perforating units form two rows and each of said rows comprises three perforating units.

52. The apparatus of claim 44, wherein said carrier means has channel means with inlet means for said one beam and further comprising means provided in said channel means for splitting said one beam into discrete beams, one for each of said perforating unit, and for directing the respective discrete beams against the corresponding focusing means.

53. The apparatus of claim 52, wherein said perforating units form a plurality of rows and said channel means includes a first channel arranged to receive said one beam from said source and a plurality of additional channels, one for each of said rows and each communicating with said first channels, said beam splitting means including first reflector means provided in said first channel to split said one beam into a plurality of second beams and to direct each second beam into a discrete second channel and second reflector means provided in said second channels, one for each perforating unit of the respective row and each arranged to split the respective second beam into discrete beams and to direct the thus obtained discrete beams against the respective focusing means.

54. The apparatus of claim 52, wherein said beam splitting means comprises at least one partially reflecting and at least one totally reflecting reflector.

55. The apparatus of claim 44, wherein the sheet-like material is an elongated web and further said positioning means for transporting the web along a predetermined path and a shroud interposed between said path and said perforating units, said shroud having a slide surface defining a portion of said path.

56. The apparatus of claim 55, wherein said slide surface is of arcuate shape.

57. The apparatus of claim 56, wherein said arcuate surface is a convex surface and said transporting means includes means for maintaining the web in contact with said convex surface.

58. The apparatus of claim 44, wherein each of said perforating units comprises a housing having a radiation admitting inlet and a radiation discharging outlet, and an optical system disposed in the housing between the respective inlet and the respective outlet and arranged to focus coherent radiation entering via said inlet upon the sheet-like material by way of said outlet.

59. The apparatus of claim 58, wherein each of said optical systems comprises a collector lens having a focus located in the plane of the sheet-like material.

60. The apparatus of claim 44, wherein said carrier means has a socket for each of said perforating units and each of said perforating units further comprises a radiation admitting inlet defined by a window including optical means for focusing radiation upon the sheet-like material and a nozzle defining a radiation discharging outlet interposed between the respective optical means and the sheet-lik material, and further comprising means for directing radiation from said source to said inlets.

61. The apparatus of claim 44, wherein the sheet-like material is a web of wrapping material for use in a machine for the processing of commodities which constitute or form part of smokers' products, said positioning comprising means for transporting the web past said perforating units and said transporting means forming part of the processing machine.

62. The apparatus of claim 44, further comprising means for conveying at least one stream of gaseous fluid between the perforating units and the sheet-like material.

63. The apparatus of claim 62, wherein each of said perforating units comprises a housing having radiation admitting inlet means, radiation discharging outlet means and a chamber communicating with the respective outlet means, and further comprising a shroud interposed between said perforating units and the sheet-like material and having apertures in register with said outlet means, said shroud and said housings defining at least one compartment communicating with said outlet means and said conveying means including means for circulating a gaseous fluid from the chambers of said housings into said compartment by way of the respective outlet means.

64. The apparatus of claim 63, further comprising means for splitting the beam into a plurality of discrete beams, one for each of said perforating units, and for directing the discrete beams into the inlet means of the respective housings, said perforating units forming a plurality of rows and said shroud and said carrier means defining a plurality of compartments, one for each of said rows and each communicating with the outlet means of the housings in the respective row, said circulating means including means for establishing a pressure differential between each of said compartments and the chambers of the housings in the respective row so that streams of gaseous fluid flow from said chambers, through the respective outlet means and into the corresponding compartments.

* * * * *